United States Patent

Mannette et al.

[11] Patent Number: 5,881,361
[45] Date of Patent: Mar. 9, 1999

[54] COMMUNICATION UNIT POWER UP SEQUENCING

[75] Inventors: Michael Russell Mannette, Bloomingdale; Camille Louise Dozier, Schaumburg; Hang Kiu Chan, Bartlett, all of Ill.

[73] Assignee: Motorola, Inc., Schaumburg, Ill.

[21] Appl. No.: 626,090

[22] Filed: Apr. 3, 1996

[51] Int. Cl.[6] .............................. H04N 1/14; H04N 7/10
[52] U.S. Cl. .............................................. 455/3.3; 348/10
[58] Field of Search .................. 455/3.3, 3.1, 3.2; 340/310.01, 825.16, 825.14, 825.52, 636, 333, 659, 663; 364/184, 187; 395/181, 182.12, 182.21, 651, 652, 653; 370/216; 348/6–12

[56] References Cited

U.S. PATENT DOCUMENTS

| | | | |
|---|---|---|---|
| 4,538,138 | 8/1985 | Harvey et al. | 340/521 |
| 4,586,179 | 4/1986 | Sirazi et al. | 371/12 |
| 4,804,938 | 2/1989 | Rouse et al. | 340/310 |
| 5,255,086 | 10/1993 | McMullan, Jr. et al. | 358/86 |
| 5,381,477 | 1/1995 | Beyers, II et al. | 380/20 |
| 5,414,455 | 5/1995 | Hooper et al. | 348/7 |
| 5,414,861 | 5/1995 | Horning | 395/750 |
| 5,455,619 | 10/1995 | Truckenmiller et al. | 348/8 |
| 5,467,397 | 11/1995 | West et al. | 380/7 |
| 5,530,435 | 6/1996 | Toms et al. | 340/825.07 |
| 5,581,801 | 12/1996 | Spriester et al. | 455/3.3 |
| 5,664,002 | 9/1997 | Skinner, Sr. | 379/56.2 |

OTHER PUBLICATIONS

Seagate Hawk 1 Family SCSI disk drives, PP: 1–14 numbered by Examiner, Jun. 1994.

Primary Examiner—Douglas W. Olms
Assistant Examiner—David R. Vincent
Attorney, Agent, or Firm—Gregory B. Gulliver

[57] ABSTRACT

A communications system (100) having a number of communications units (134) connected to the communications system (100) in which the communications units (134) receive power from the communications system (100). In response to a loss of power or some other event requiring the communications units (134) to shift into an active state, the communications units (134) shift into the active state at different times, avoiding peak power loads within the communications system (100).

7 Claims, 4 Drawing Sheets

COMMUNICATION UNIT POWER UP SEQUENCING

BACKGROUND OF THE INVENTION

The present invention relates generally to communications systems, and in particular to an improved cable communications system. Still more particularly, the present invention relates to a method and apparatus for shifting communications units within a cable communications system into various states of activity.

In a cable communications system using hybrid fiber coaxial cable, large numbers of subscriber units derive bias voltage, current or AC/DC supply power from network power supplies. Such cable communications systems use time division multiplexing to take advantage of trunking efficiencies. In this type of system, the infrastructure is not capable of servicing all subscriber units simultaneously Typically, subscriber units operate either in an active state or a standby state, also called a sleep state. In the active state, a subscriber unit is in the highest power consumption state in which the receiver and transmitter of the subscriber unit are powered up. In the standby or sleep state, a subscriber unit is in its lowest power consumption state. A subscriber unit in an active state can consume ten times more power than a subscriber unit in the sleep state.

Subscriber units are required to register on a cable communications system after reset to receive network wide system parameters. Registration with the cable communications system requires the subscriber unit to enter the active state. During periods of network power supply outages within the cable communications system infrastructure, all subscriber units are reset. When network power supplies are restored, all subscriber units simultaneously enter the active state for registration. When large numbers of subscriber units enter the active state simultaneously, a peak power load occurs on the power supply in the cable communications system and congestion occurs, effectively blocking subscriber unit access. This blocking increases the time required to register a subscriber unit. Additionally, peak power loads can trip protection circuits within the cable communications system, causing the subscriber unit to reset again. The power up registration attempt followed by power supply overload protection circuits being tripped can cause the cable communications system to become unstable.

Therefore, it would be desirable to have an improved method and apparatus for registering subscriber units in a cable communications system.

DESCRIPTION OF A PREFERRED EMBODIMENT

According to the present invention, a communications system is provided in which communications units are connected to the communications system with the communications units receiving power from the communications system. In response to restoration of power or in response to some other event requiring communications units to shift into an active state, the communications units shift into the active state at different times to avoid peak power loads within the communications system.

Figure 1:
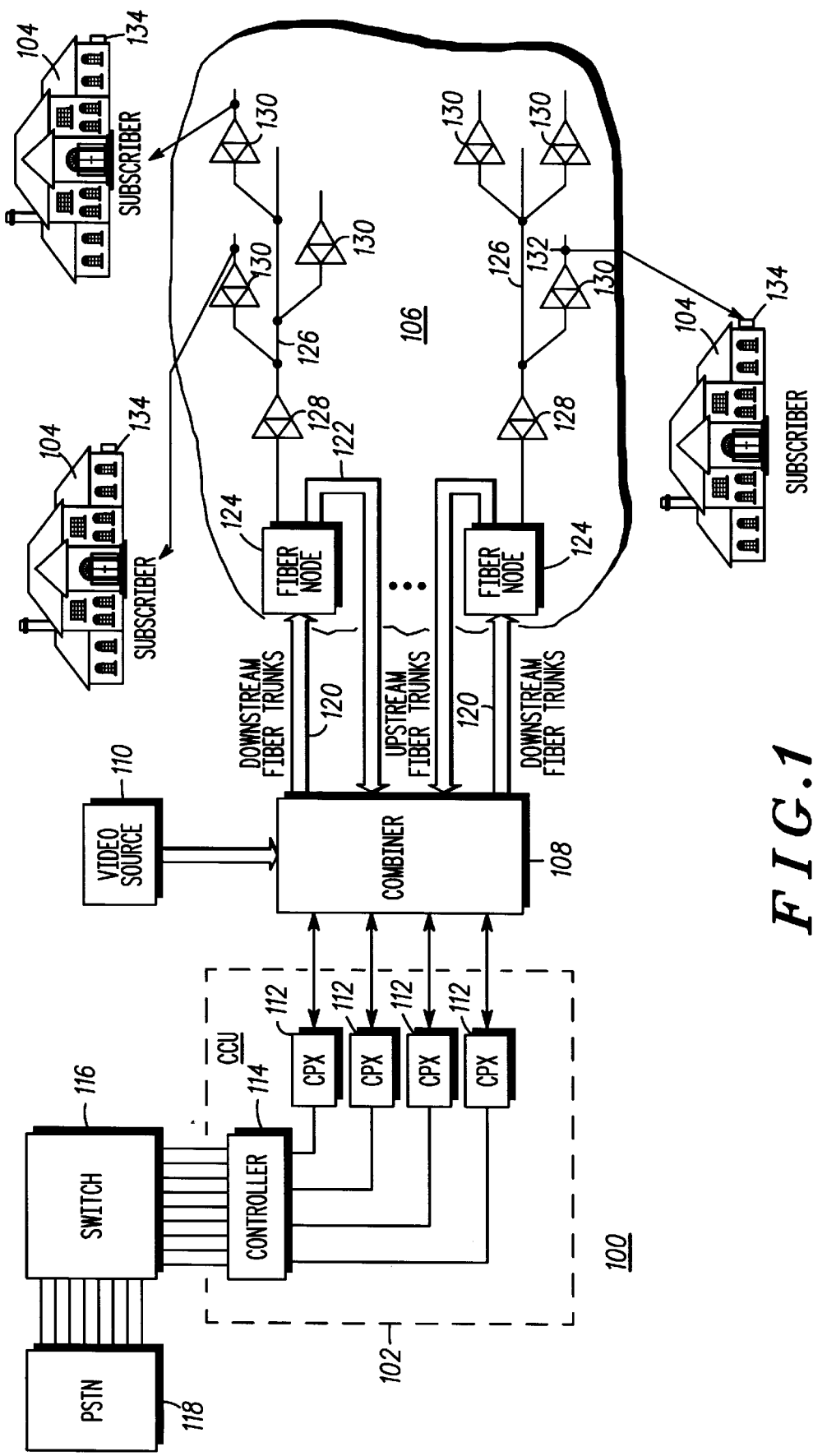
FIG. 1 is a diagram of a communications system in which the present invention may be implemented.

With reference now to the figures, and in particular with reference to FIG. 1, a diagram of a communications system 100 is illustrated in which the present invention may be implemented. Communications system 100 is an example of a basic cable system architecture that is a hybrid cable system using a combination of fiber and coaxial cable to distribute subscriber services to customer premises equipment. Alternatively, communications system 100 may consist entirely of coaxial cable. Regardless of the cable infrastructure, a cable branch will serve a distribution area shared by a community of subscribers. In the depicted example, communications system 100 is a cable telephony communications system that provides telephone services along with cable television services on a coaxial fiber-optic cable television infrastructure.

Communications system 100 includes a cable control unit (CCU) 102 or some other base communications unit that is connected to subscribers 104 by a distribution network 106 and a combiner 108. Combiner 108 has an input for video sources 110. CCU 102 also includes cable port transceivers (CPXs) 112, which are connected to combiner 108. These cable port transceivers generate downstream carrier channels in communications system 100. Combiner 108 receives modulated RF channels from video sources 110 and from CPXs 112 in CCU 102 and sums these signals together to be sent over distribution network 106. CPXs 112 are controlled by a controller 114, which provides all functions necessary to support the data link portion of the system. The headend typically includes CCU 102, combiner 108, and video sources 110. Digital switch 116 may be in a remote location from the headend or may be located at the headend itself. These components are the headend equipment responsible for providing access and management of services to a cable branch in communications system 100. Controller 114 in CCU 102 is connected to switch 116 through digital carrier facilities, such as T1 or E1, which is, in turn, connected to a public switching telephone network (PSTN) 118. Switch 116 may be, for example, a class 5 TELCO switch.

Transmissions from CCU 102 in distribution network 106 are facilitated by downstream fiber trunks 120 and upstream fiber trunks 122. These fiber trunks are fiber optic cables and are connected to fiber nodes 124. Fiber nodes 124 perform directional conversion between the optical domain of fiber optical cable and the electrical domain of coaxial cable in distribution network 106. Each fiber node 124 has a connection to at least one cable branch 126. In the depicted example, cable branch 126 is comprised of coaxial cable and includes trunk amplifiers 128, which are bi-directional amplifiers in the depicted example. Additionally, bi-directional line extenders 130 are located near taps 132, which are connected to cable access units (CAUs) 134 located at subscriber 104. These CAUs are also called "communications units" or "subscriber units". Each cable branch 126 includes one or more serving areas.

CCU 102 is used to provide telephony, integrated services digital network (ISDN) services, digital video, interactive video, or interactive multimedia in communications system 100. Additionally, CCU 102 controls the cable spectrum, infrastructure resources, and services for all CAUs in a serving area, as well as managing multiple serving areas.

CAUs 134 provide telephone, ISDN, digital video, interactive video, interactive multimedia, and television services at subscriber premises. Typically, a CAU is mounted on the side of the subscriber's home, or on an unintrusive place, such as a basement or attic. The CAU manages the uplink and downlink communications paths and transports cable television channels to the subscriber's television.

According to the present invention, the cable telephony communications system divides up the radio frequency (RF) spectrum for us with multiple subscribers such that no individual subscriber has a dedicated frequency range. The spectrum allocated for service within a single cable branch may be used again for a different group of subscribers in every cable branch of distribution network 106. A different portion of the spectrum may be allocated for uplink communications and downlink communications. The spectrums also are further divided into channels within these uplink and downlink allocations.

Communications system 100 is divided up into areas with separate signal paths in which the RF spectrum allocated for the cable telephony service may be used again for a different group of subscribers in each separate cable branch of the distribution network 106. In the downlink spectrum, a large number of conventional television channels (for example 80 channels, each 6 MHz in width) are conveyed to cable television subscribers. In the reverse, in the uplink spectrum, other communications are provided. A portion of the downlink spectrum and a portion of the uplink spectrum are dedicated to a plurality of trunked traffic channels serving a large number of subscribers having telephone and/or other two way service. Within these dedicated spectrum allocations, a number of RF channels are deployed. These RF channels are spaced 600 KHz apart and each channel contains 8 digitally encoded time division multiplexed information bearing channels. Active channels are operated in pairs with one in the uplink segment of the allocation associated with each one in the downlink segments. This association provides for frequency division duplex (FDD) operations. In addition, communications system 100 provides for time division multiplexing in which a number of time division channels are derived from the transmission medium by dividing the access to the medium into sequential "time slots".

Figure 2:
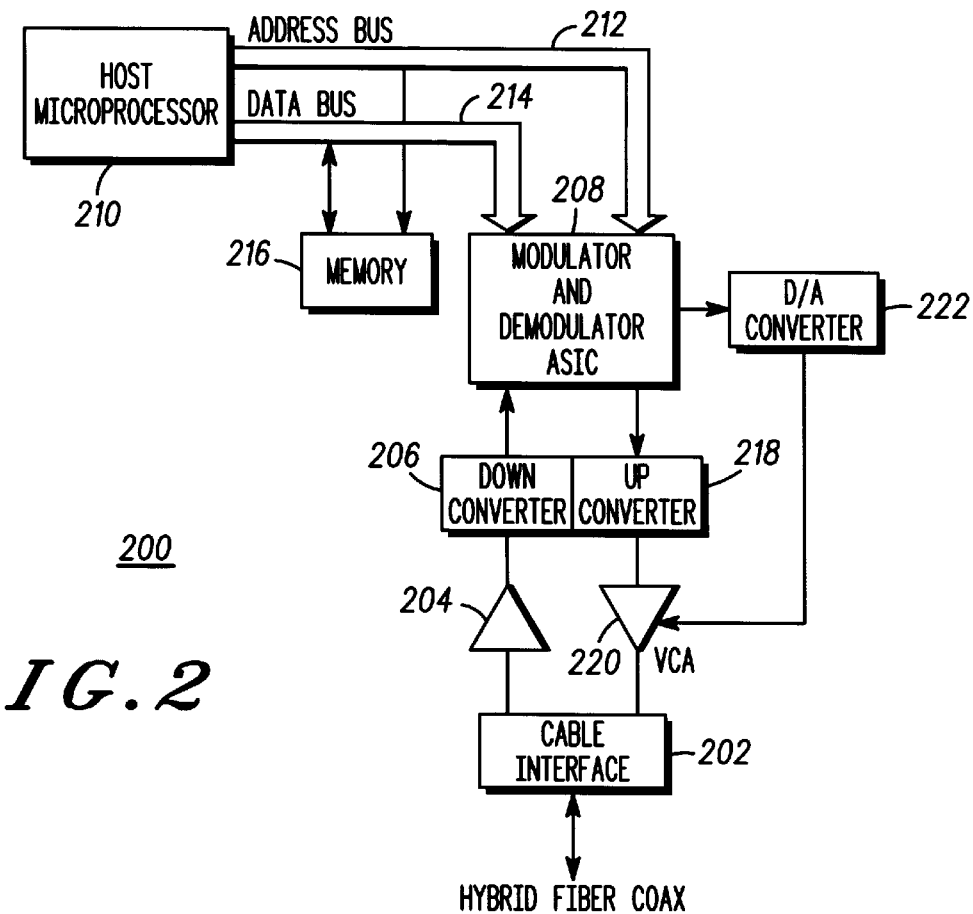
FIG. 2 is a block diagram of components in a cable access unit (CAU) used for power up sequencing according to the present invention.

With reference now to FIG. 2, a block diagram of components in a CAU used for power up sequencing is depicted according to the present invention. CAU 200 is connected to hybrid coaxial cable by cable interface 202. Signals transmitted to CAU 200 are conditioned by buffer 204. Thereafter, the signals are processed by down converter 206 and sent to modulator and demodulator application specific integrated circuit (ASIC) 208.

The demodulated information is received by host microprocessor 210 from modulator and demodulator ASIC 208 via address bus 212 and data bus 214. Data is stored in memory 216 along with instructions executable by host microprocessor 210. Memory 216 may include random access memory along with read only memory. Instructions for power up sequencing in CAU 200 may be stored in random access memory or in read only memory. Memory 216 also may be a non-volatile memory device, which is a memory device that retains data without power being applied to it (e.g., a Programmable Read Only Memory (PROM)).

Host microprocessor 210 sends messages from CAU 200 through address bus 212 and data bus 214 to modulator and demodulator ASIC 208. The messages are sent to up converter 218 and the outgoing signal is amplified by voltage controlled amplifier (VCA) 220. The output of voltage controlled amplifier 220 is connected to cable interface 202 for transmission on hybrid fiber coaxial cable. Voltage controlled amplifier 220 is controlled by digital to analog (D/A) converter 222, which stores a value sent to it by host microprocessor 210, via modulator and demodulator ASIC 208. This value is converted by D/A convertor 222 into a voltage signal, which is used to control voltage controlled amplifier 220.

According to the present invention, a cable communications system is provided in which peak power periods and system overloads after a system reset occur. Peak power load after system reset is avoided by providing each CAU a unique, distributed delay between power up and entrance to the active state. According to the present invention, a CAU generated delay value and a sleep timer are provided to implement the distributed power up delay. A sleep timer may be implemented using code that prevents the CAU from shifting into an active state until the timer has expired.

Figure 3:
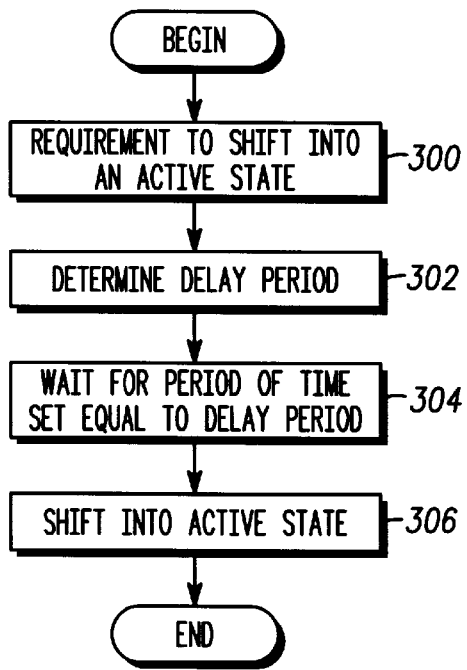
FIG. 3 is a flowchart of a process for shifting into an active state in a CAU according to the present invention.

With reference now to FIG. 3, a flowchart of a process for shifting a CAU into an active state is illustrated according to the present invention. The process begins by detecting a requirement to shift into an active state (step 300). Thereafter, a delay period is determined (step 302). The CAU waits for the period of time set by the delay period (step 304) and then shifts into an active state (step 306) with the process terminating thereafter.

Figure 4:
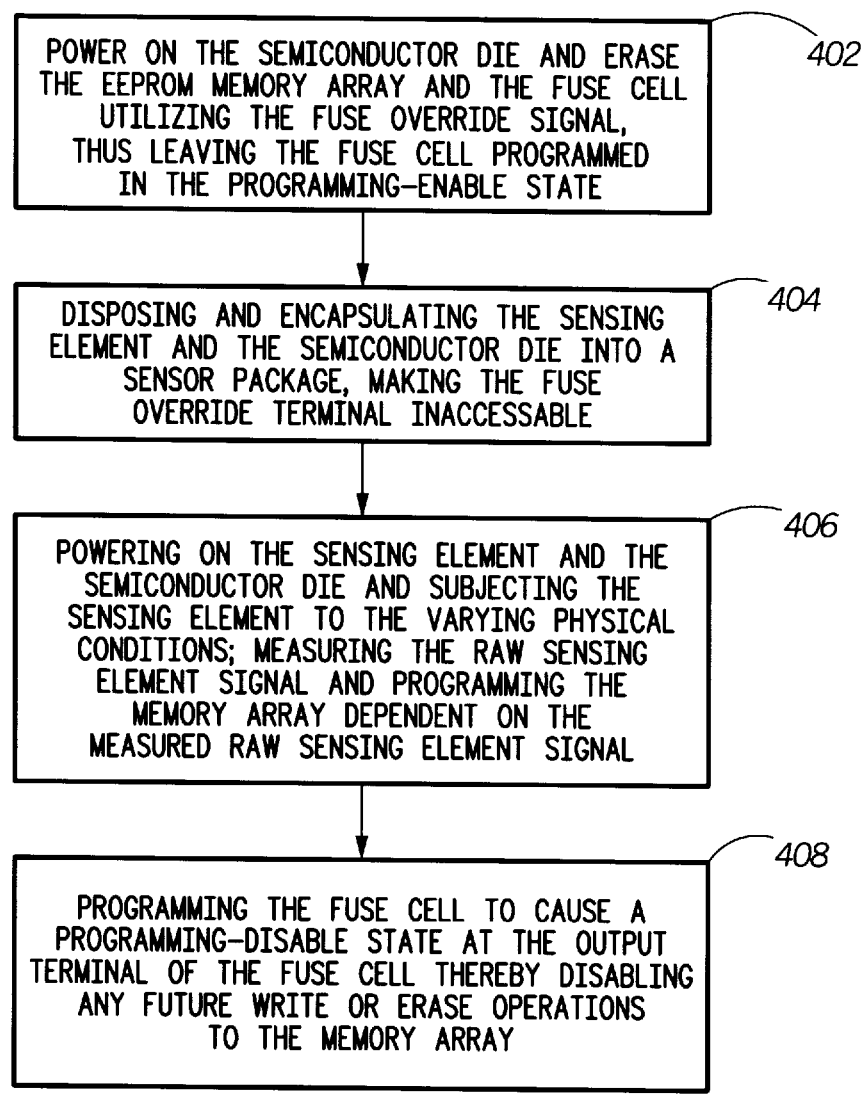
FIG. 4 is a flowchart of a process for resetting and registering a CAU in response to a power outage according to the present invention.

With reference now to FIG. 4, a flowchart of a process for resetting and registering a CAU in response to a power outage is depicted according to the present invention. The process begins by detecting a reset state (step 400). A reset state typically occurs when a power outage has occurred within the communications system. Thereafter, the CAU determines a delay value (step 402). This delay value is determined in a manner that avoids all of the CAUs resetting and registering with the cable communications system at the same time. The CAU waits for a period of time that is set equal to the delay value determined in step 402 (step 404). Thereafter, the CAU shifts into an active state (step 406) and registers with the cable communications system (step 408) with the process terminating thereafter.

Figure 5:
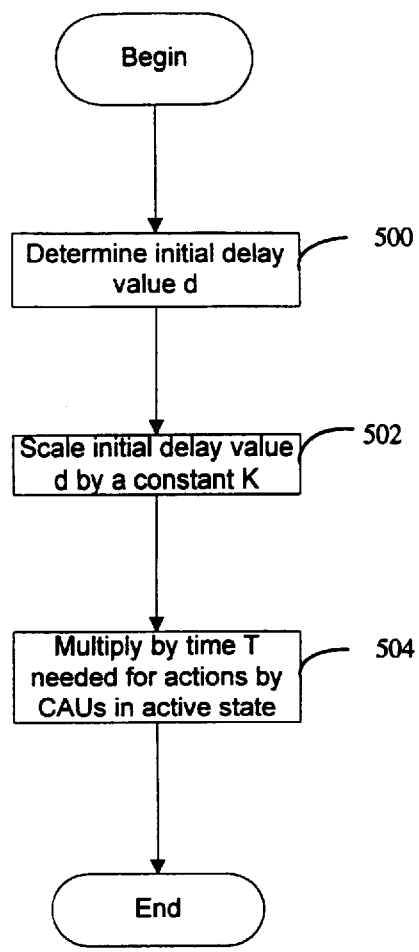
FIG. 5 is a flowchart of a process for determining a delay according to the present invention.

With reference now to FIG. 5, a flowchart of a process for determining a delay is illustrated according to the present invention. The process begins by determining an initial delay value d (step 500). The CAU electronic identification, a unique identifier for a CAU, is used to determine the delay value d and may be used directly or as a seed for a random number generator to determine the delay. Initial delay value d is scaled by a constant K (step 502) in which K is a constant that is inversely proportional to the percentage of CAUs that can simultaneously enter the active state. Thereafter, the value from step 502 is multiplied by time T, which is the time needed for the CAUs to register in the active state. In other words, time T is the time necessary for the CAUs to perform activities in the active state and leave the active state. This produces an absolute delay D which is used by the sleep timer to maintain the CAU in an inactive state until the timer expires. Absolute delay value D is determined by the following equation:

$$D = d*K*T$$

For example, a scale constant K of 10 would limit the number of CAUs simultaneously entering the active state after reset to 1/10 of the total number of CAUs. The values of K and T are stored in a CAU and can be reset by the cable communications systems sending new values or through code downloads to the CAU. The delay value may be determined in a number of different ways other than that depicted in FIG. 5. The delay value for a CAU is determined such that a peak power load within a communications system is avoided. As a result, every CAU might enter an active state at a different time (using a unique delay for each CAU) or groups of CAUs may enter an active state at different times from other CAUs in the communications system. Although the processes depict CAUs as the communications units, the processes of the present invention may be applied to other types of communications units other than CAUs according to the present invention. Additionally, it will be recognized that the methods consistent with the present invention may by implemented with software or firmware instructions in any storage device (chip, tape, disk, etc.) readable by a processor.

As a result, the present invention provides an improved method and apparatus for avoiding problems associated with peak power load and system congestion by preventing all of the CAUs from entering the active state at the same time. According to the present invention, each CAU shifts into the active state after a delay period has passed. This delay period is unique between CAUs. According to the present invention, some CAUs may have the same delay period, but these delays are set such that a peak power load is avoided within the cable communications system.

While the invention has been particularly shown and described with reference to a preferred embodiment, it will be understood by those skilled in the art that various changes in form and detail may be made therein without departing from the spirit and scope of the invention.

What is claimed is:

1. A cable communications system comprising:
   a cable distribution network;
   a plurality of communications units connected to the cable distribution network;
   assignment means for assigning each of the plurality of communications unit a delay period that differs substantially from communications unit to communications unit; and
   shifting means for shifting each of the plurality of communications units into an active state from another state after its respective delay period has expired, in response to a selected condition.

2. The cable communications system of claim 1, wherein the selected condition is a loss and restoration of supply power within the cable distribution network.

3. The cable communications system of claim 1, wherein the selected condition is a request from the cable communications system to reset the plurality of communications units.

4. A cable communications system comprising:
   a cable distribution network;
   a plurality of communications units connected to the cable distribution network, the plurality of communications units receiving supply power from the cable distribution network; and
   a plurality of assigned delay periods substantially different from communication unit to communication unit, wherein each of the assigned delay periods being assigned to a respective one of the communications units, each of the plurality of communications units abstains from communication during the assigned delay periods, each of the plurality of communications units shifting into an active state from another state after its respective assigned delay period has expired allowing communication over the cable communications system, in response to a restoration of supply power within the cable distribution network, wherein the delay period is longer than a period required to power up the communications unit.

5. The cable communications system of claim 4, wherein a first portion of the assigned delay periods within the plurality of assigned delay periods are set equal to a first delay while a second portion of the assigned delay periods within the plurality of assigned delay periods are set equal to a second delay.

6. The cable communications system of claim 4, wherein each of the plurality of assigned delay periods is set equal to a unique delay.

7. The cable communications system of claim 4, wherein each of the plurality of communications units shifting into an active state from another state registers with the cable communications system.

\* \* \* \* \*